US011306909B2

(12) United States Patent
Truswell

(10) Patent No.: US 11,306,909 B2
(45) Date of Patent: Apr. 19, 2022

(54) DRIVER ASSEMBLY FOR A LIGHTING FIXTURE

(71) Applicant: Hubbell Limited, London (GB)

(72) Inventor: Michael Truswell, Hamilton (GB)

(73) Assignee: HUBBELL LIMITED, London (GB)

( * ) Notice: Subject to any disclaimer, the term of this patent is extended or adjusted under 35 U.S.C. 154(b) by 0 days.

(21) Appl. No.: 17/055,662

(22) PCT Filed: May 17, 2019

(86) PCT No.: PCT/GB2019/051361

§ 371 (c)(1),
(2) Date: Nov. 16, 2020

(87) PCT Pub. No.: WO2019/220133

PCT Pub. Date: Nov. 21, 2019

(65) Prior Publication Data

US 2021/0239307 A1 Aug. 5, 2021

(30) Foreign Application Priority Data

May 18, 2018 (GB) ..................................... 1808091

(51) Int. Cl.
*F21V 23/00* (2015.01)
*F21V 31/04* (2006.01)
(Continued)

(52) U.S. Cl.
CPC ............ *F21V 23/009* (2013.01); *F21V 31/04* (2013.01); *F21S 8/04* (2013.01); *F21Y 2103/20* (2016.08); *F21Y 2115/10* (2016.08)

(58) Field of Classification Search
CPC ............................... F21V 23/009; F21V 31/04
(Continued)

(56) References Cited

U.S. PATENT DOCUMENTS 5,984,570 A * 11/1999 Parashar ................ E01F 9/559 362/153.1
6,354,714 B1 * 3/2002 Rhodes ..................... F21S 4/24 362/153.1
(Continued)

FOREIGN PATENT DOCUMENTS

CN 203406769 U 1/2014
DE 202009000236 U1 7/2010
(Continued)

OTHER PUBLICATIONS

PCT/GB2019/051361 International Search Report and Written Opinion dated Sep. 16, 2019.
GB1808091.1 Search Report dated Nov. 21, 2018.

*Primary Examiner* — Bryon T Gyllstrom
(74) *Attorney, Agent, or Firm* — Michael Best & Friedrich LLP

(57) ABSTRACT

A driver assembly (200) for a lighting fixture (100) is provided. The driver assembly (200) includes a housing (220) defining a cavity (234). The driver assembly (200) includes a driver circuit (210) disposed within the cavity (234). The driver circuit (210) can be configured to provide power to one or more light emitting diodes (116) of the lighting fixture (100). The driver assembly (200) can include a potting material (237) disposed within the cavity (234). The driver assembly (200) can include a base (260) attached to the housing (220) to enclose the driver circuit (210) and the potting material (237) within the cavity (234).

14 Claims, 15 Drawing Sheets

(51) Int. Cl.

| | |
|---|---|
| ***F21Y 115/10*** | (2016.01) |
| ***F21Y 103/20*** | (2016.01) |
| ***F21S 8/04*** | (2006.01) |

(58) Field of Classification Search

USPC ........................................................ 362/552

See application file for complete search history.

(56) References Cited

U.S. PATENT DOCUMENTS

| | | | | |
|---|---|---|---|---|
| 2004/0137173 | A1* | 7/2004 | Selverian | H05K 5/064 428/34.1 |
| 2004/0234335 | A1* | 11/2004 | Snagel | E01F 9/553 404/16 |
| 2008/0310156 | A1* | 12/2008 | Wang | F21V 31/04 362/231 |
| 2009/0034247 | A1* | 2/2009 | Boyer | F21V 31/04 362/225 |
| 2009/0272986 | A1 | 11/2009 | Chan et al. | |
| 2011/0114383 | A1* | 5/2011 | Covers | B29C 39/006 174/521 |
| 2015/0216065 | A1* | 7/2015 | Chai | F21V 23/023 361/679.01 |
| 2015/0300608 | A1* | 10/2015 | Hartman | F21S 4/20 362/145 |
| 2020/0182417 | A1* | 6/2020 | Kager | F21V 31/04 |

FOREIGN PATENT DOCUMENTS

| | | | |
|---|---|---|---|
| DE | 102014104856 | A1 | 10/2015 |
| EP | 0264039 | A2 | 3/1987 |
| EP | 1439555 | A1 | 7/2004 |
| EP | 2448389 | A1 | 2/2010 |
| EP | 2998648 | A1 | 3/2016 |
| GB | 2486236 | | 6/2012 |
| GB | 2490421 | | 10/2012 |

* cited by examiner

DRIVER ASSEMBLY FOR A LIGHTING FIXTURE

FIELD

The present disclosure relates generally to lighting fixtures, and more particularly to a driver assembly for lighting fixtures.

BACKGROUND

Lighting fixtures (e.g., luminaires) using LEDs or other solid-state light sources have in recent years become somewhat practical and continue to penetrate the lighting market due to the increased luminous efficacy of commercially available LED components. LED lighting systems can include one or more LED devices that become illuminated as a result of the movement of electrons through a semiconductor material. LED luminaires are desirable as they offer energy savings due to good luminous efficacy combined with the ability to precisely control light distribution patterns, which is of particular importance for certain lighting scenarios. Electrical components for powering and controlling LED luminaires are typically contained within an associated housing.

For instance, LED lighting fixtures can also include one or more LED driver circuits that are used to convert input power from an AC power source to a suitable driver current for powering LED arrays having one or more LED devices.

SUMMARY

Aspects and advantages of embodiments of the present disclosure will be set forth in part in the following description, or may be learned from the description, or may be learned through practice of the embodiments.

On example aspect of the present disclosure is directed to a driver assembly for a lighting fixture. The driver assembly can define a lateral direction, a transvers direction, and a vertical direction. The driver assembly can include a housing defining a cavity. The driver assembly can include a driver circuit disposed within the cavity. The driver circuit can be configured to provide power to one or more light emitting diodes (LEDs) of the lighting fixture. The driver assembly can include a potting material disposed within the cavity. The driver assembly can include a base attached to the housing to enclose the driver circuit and the potting material within the cavity.

Other example aspects of the present disclosure are directed to lighting systems, light engines, lighting circuits, lighting fixtures, devices, and apparatuses according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
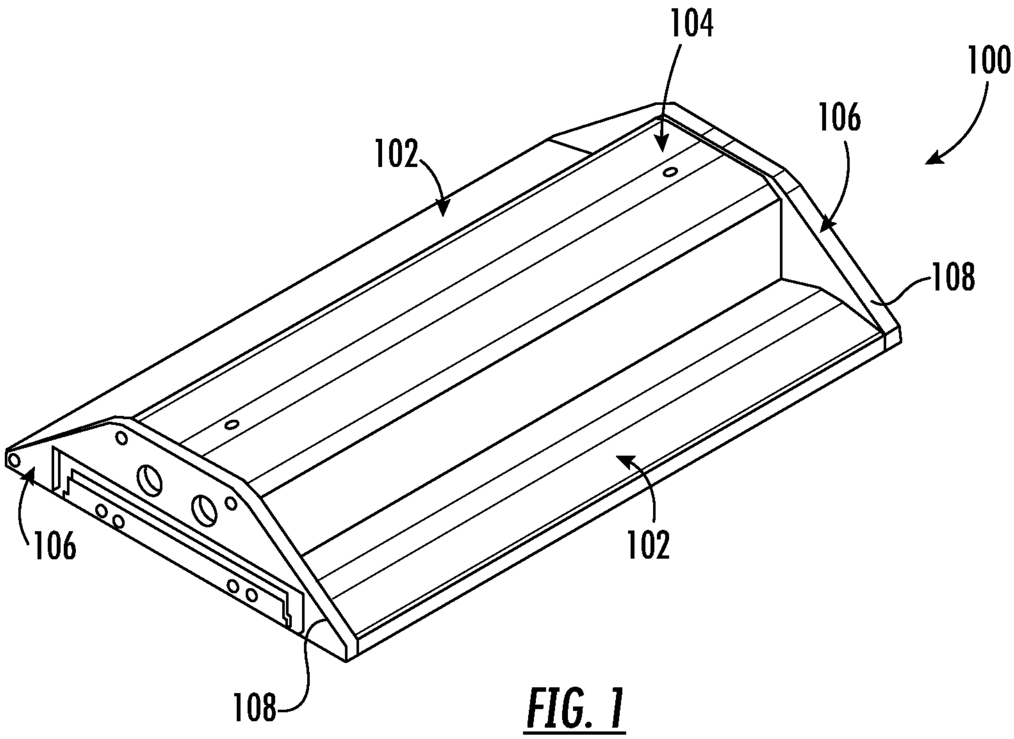
FIG. 1 depicts a perspective view of a lighting fixture having a plurality of modular lighting components according to example embodiments of the present disclosure.
Figure 2:
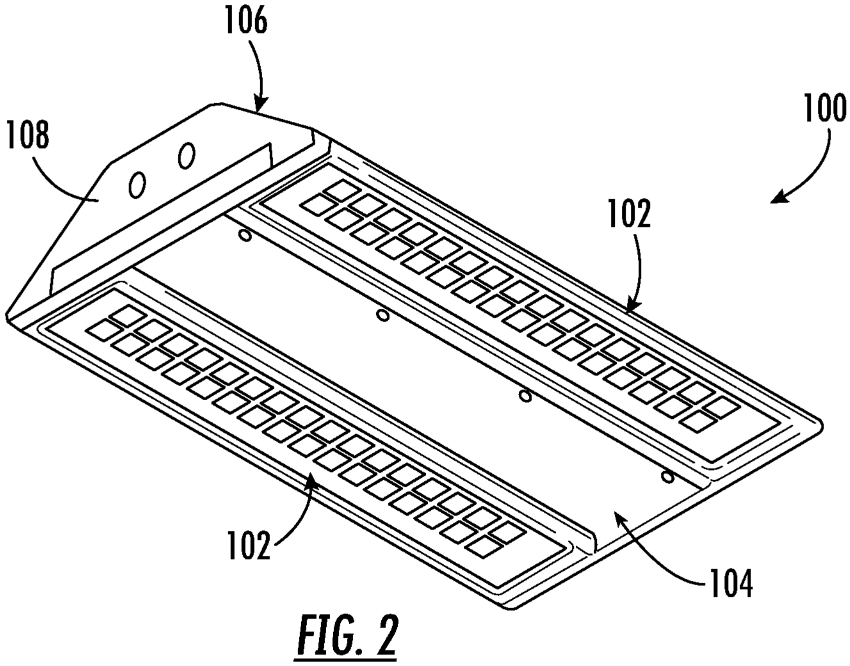
FIG. 2 depicts another perspective view of a lighting fixture having a plurality of modular lighting components according to example embodiments of the present disclosure.
Figure 3:
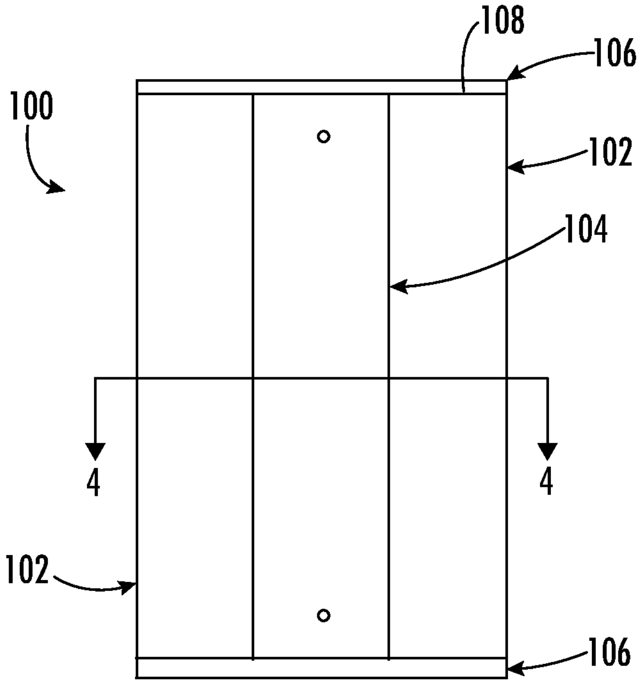
FIG. 3 depicts a top view of a lighting fixture having a plurality of modular lighting components according to example embodiments of the present disclosure.
Figure 4:
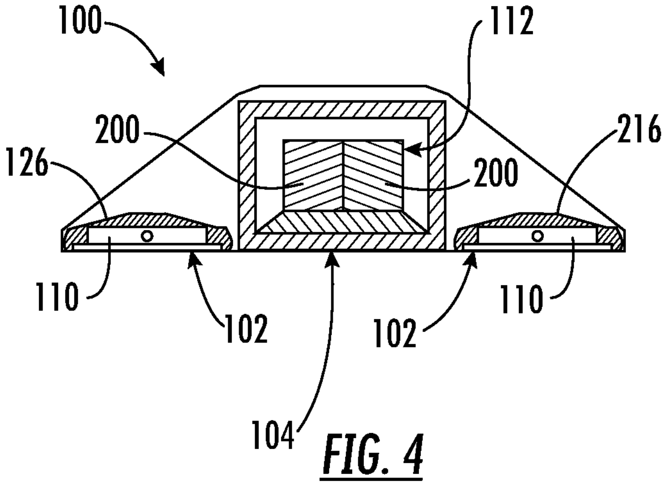
FIG. 4 depicts a cross-sectional view of the lighting fixture of FIG. 3 along line 4-4.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Examples aspects of the present disclosure are directed to a driver assembly for a lighting fixture. For example, in certain embodiments, the lighting fixture may be rated for hazardous areas where an explosive gas atmosphere is likely to occur during normal operation or in a certain number of instances in a certain time period. For example, a hazardous environment may include areas having an explosive atmosphere of more than 10, but less than 1,000 hours per year. In addition, hazardous areas may be generally defined as any place in which an explosive gas atmosphere may occur in quantities such as to require special precautions to protect the safety of workers.

The driver assembly can define a lateral direction, a transverse direction, and a vertical direction. The driver assembly can include a housing defining a cavity. The driver assembly can include a driver circuit disposed within the cavity. The driver circuit can be configured to power one or more LEDs associated with the lighting fixture. The driver assembly can include a potting material disposed within the cavity. In some embodiments, the potting material can include sand. The driver assembly can include a base attachable to the housing to enclose the driver circuit and the potting material within the cavity. In this manner, the driver circuit can be protected from the explosive atmosphere surrounding the housing.

In some implementations, a bottom portion of the housing can define one or more indentations configured to accommodate one or more conductors (e.g., wires) associated with the driver circuit. For instance, the bottom portion of the housing can define a first set of indentations and a second set of indentations spaced apart from the first set of indentations along the lateral direction. The bottom portion of the housing can further define a third set notches and a fourth set of notches spaced apart from the third set of notches along the lateral direction. In addition, the third and fourth set of notches can be spaced apart from the first and second set of notches along the vertical direction.

In some implementations, the base can define one or more indentations configured to accommodate the one or more conductors associated with the driver circuit. For instance, the base can define a first set of indentations and a second set of indentations spaced apart from the first set of indentations along the lateral direction.

Additionally or alternatively, the base can include a first side and a second side spaced apart from the first side along the lateral direction. The first side can define a first recess configured to accommodate a first set of conductors associated with the driver circuit. The second side can define a second recess configured to accommodate a second set of conductors associated with the driver circuit. When the base is attached to the housing, the first and second recesses can be filled with a solid or gelatinous material (e.g., epoxy, cement, etc.) to seal the driver circuit within the cavity. In this manner, the driver circuit can be isolated from an external environment surrounding the housing. Accordingly, the driver assembly of the present disclosure can be used in lighting fixture installed in hazardous environments, such as an oil rig.

Example aspects of the present disclosure are discussed with LED light sources for purposes of illustration and discussion. Those of ordinary skill in the art, using the disclosures provided herein, will understand that other suitable light sources (e.g., other solid-state light sources, fluorescent light sources, etc.) can be used without deviating from the scope of the present disclosure. As used herein, a “lighting fixture” or “luminaire” refers to a device used to provide light or illumination using one or more light sources. The use of the term “about” in conjunction with a numerical value refers to within 10% of the stated amount.

Referring now to the drawings, FIGS. 1-4 depict various views of components of a lighting fixture 100 according to example embodiments of the present disclosure. As will be discussed in more detail below, the lighting fixture 100 can include a plurality of modular components to readily adapt the lighting fixture 100 to a plurality of different lighting applications. More particularly, the lighting fixture 100 can include a plurality of modular lighting components 102 secured to a separate modular housing portion 104 via a securement assembly 106. For instance, in example implementations, the securement assembly 106 can include at least one end plate 108 configured to secure the modular housing portion 104 and the modular lighting component(s) 102 together. More specifically, as shown, the securement assembly 106 may include opposing end plates 108, i.e. one at each end of the lighting fixture 100.

In some embodiments, the modular housing portion 104 may correspond to a central housing portion that secures and houses various components of the lighting fixture 100, such as electrical components, conductors, and other components of the lighting fixture 100. For example, as shown particularly in FIG. 4, the modular housing portion 104 may house a power circuit 112 for providing power to the modular lighting components 102. For instance, in certain embodiments, the power circuit 112 can include a driver assembly 200 for converting an alternating current (AC) power to a direct current (DC) power suitable for energizing one or more LED devices 116 of the modular lighting components 102. In some embodiments, the driver assembly 200 can accept, for instance, an about a 100V to about a 277 V 50 Hz or 60 Hz AC input or an about a 347V to 480V 50 Hz or 60 Hz AC input. In some embodiments, the driver assembly 200 can be a dimmable driver assembly. The numbers, types, orientations, locations, configurations, etc. of the components of the power circuit 112 can be modified as needed depending on the lighting application of the lighting fixture 100. Additionally, and/or alternatively, the power circuit 112 can include more, less, and/or different components than shown. Other suitable power circuits can be used without deviating from the scope of the present disclosure. For instance, power circuits that do not include transformers can be used without deviating from the scope of the present disclosure.

It should also be understood that the modular housing portion 104 can be made from any suitable material, such as such as aluminum. In addition, other materials, such as die cast aluminum, stainless steel, galvanized steel, powder coated steel, or other material such as Glass Reinforced Plastic (GRP), can be used without deviating from the scope of the present disclosure. In further implementations, the modular housing portion 104 and/or the modular lighting components 102 can act as a thermal heat sink for heat generated by electrical components of the lighting fixture 100 by conducting heat away from heat generating sources within the housing portion 104 to the ambient.

In particular implementations, the modular lighting components 102 can be arranged on opposing sides of the central housing portion 104 such that the modular lighting components 102 mirror one another. According to particular aspects of the present disclosure, more or fewer modular lighting components 102 can be mounted to the central housing portion 104. For instance, in further embodiments, the lighting fixture 100 can include only a single modular lighting component 102. Such a lighting fixture 100 can be suitable for applications requiring less lumen output relative to the lighting fixture 100 with two modular lighting components 102 shown in the illustrated figures. In some embodiments, the lighting fixture 100 can include four modular lighting components 102. In such embodiments, as shown, two modular components 104 can be arranged on each side of the central housing portion 104 in an end-to-end configuration. In alternative embodiments, modular lighting components 102 may be arranged on only one side of the housing portion 104. For example, two modular lighting components 102 can be arranged in an end-to-end configuration on one side of the housing portion 104. It should be understood that any number of modular components 102 can be arranged in any suitable manner so as to extend a length of the overall lighting fixture 100, including a single modular lighting component or a plurality of lighting components.

Figure 5:
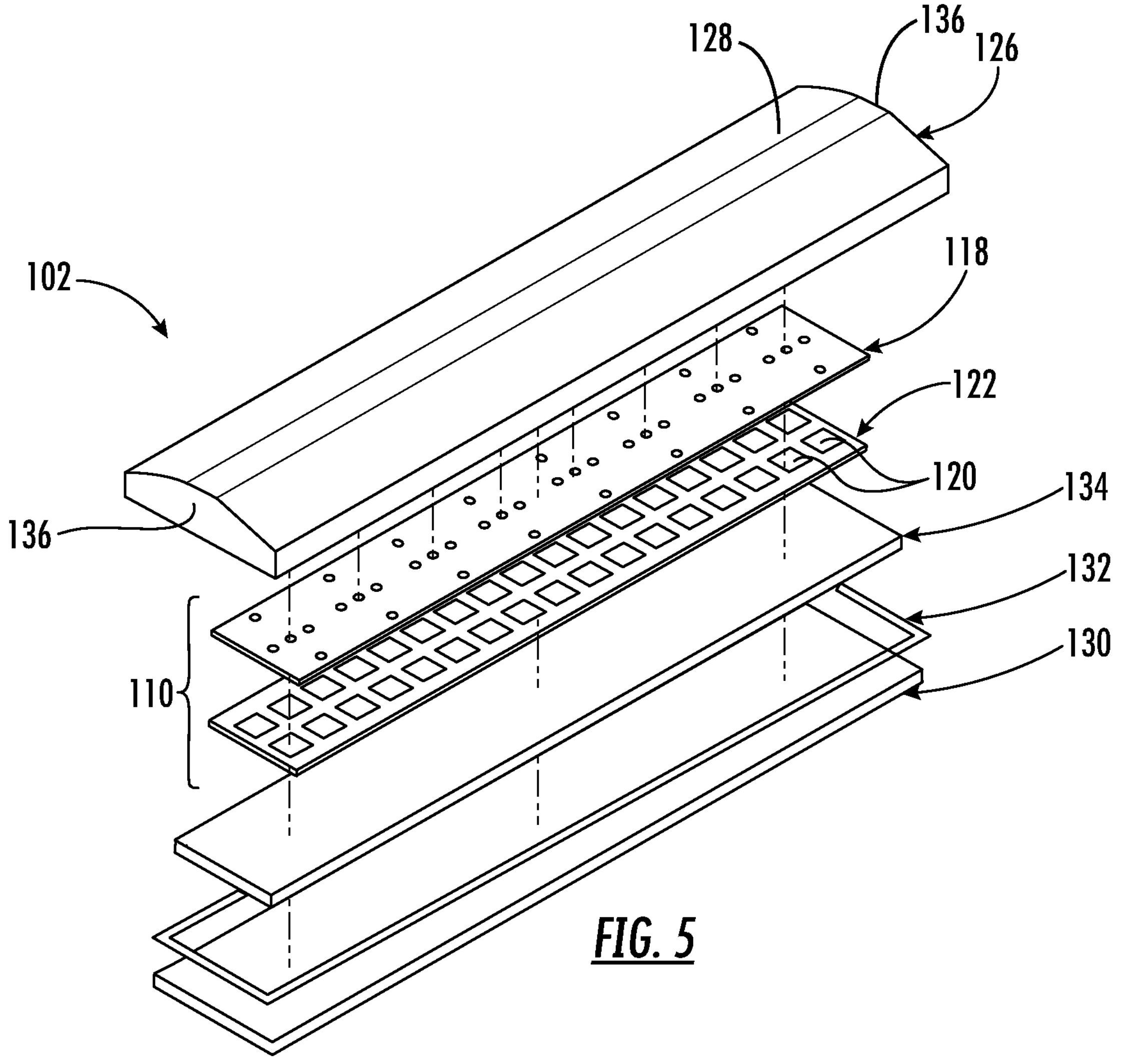
FIG. 5 depicts an exploded view of a modular lighting component of a lighting fixture according to example embodiments of the present disclosure.
Figure 6:
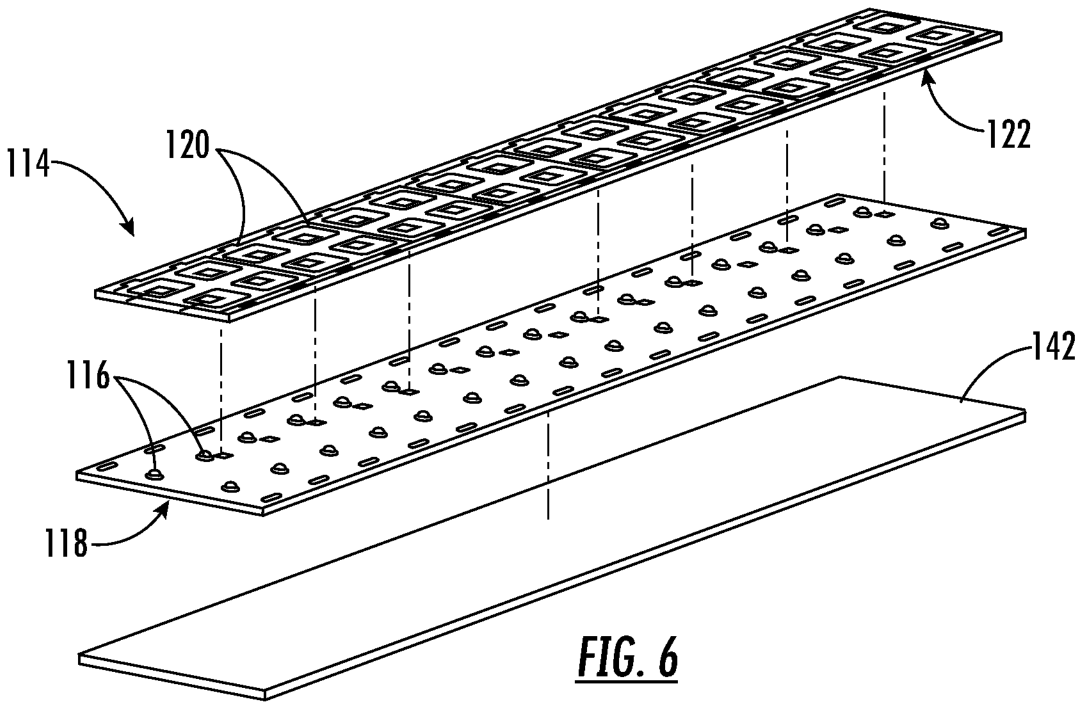
FIG. 6 depicts an exploded view of an LED module of a lighting fixture according to example embodiments of the present disclosure.
Figure 7:
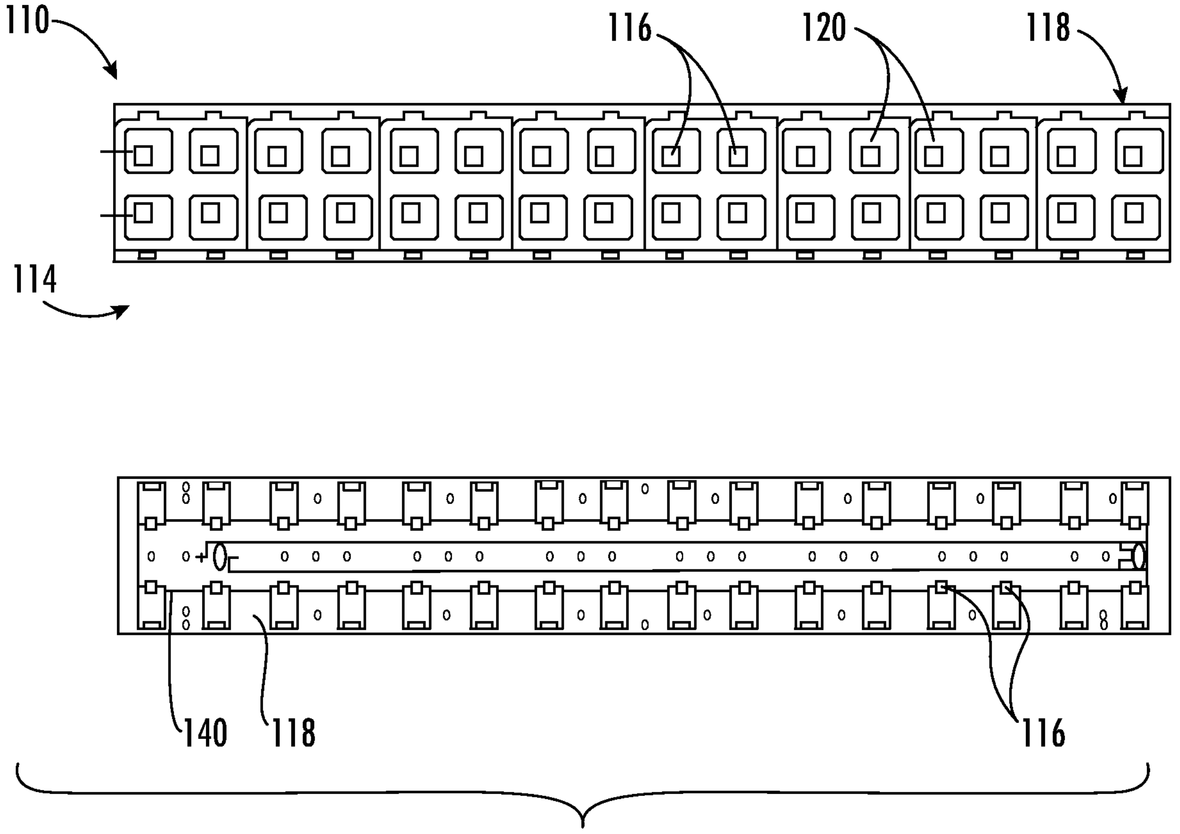
FIG. 7 depicts a top view of an LED module of a lighting fixture according to example embodiments of the present disclosure.
Figure 8:
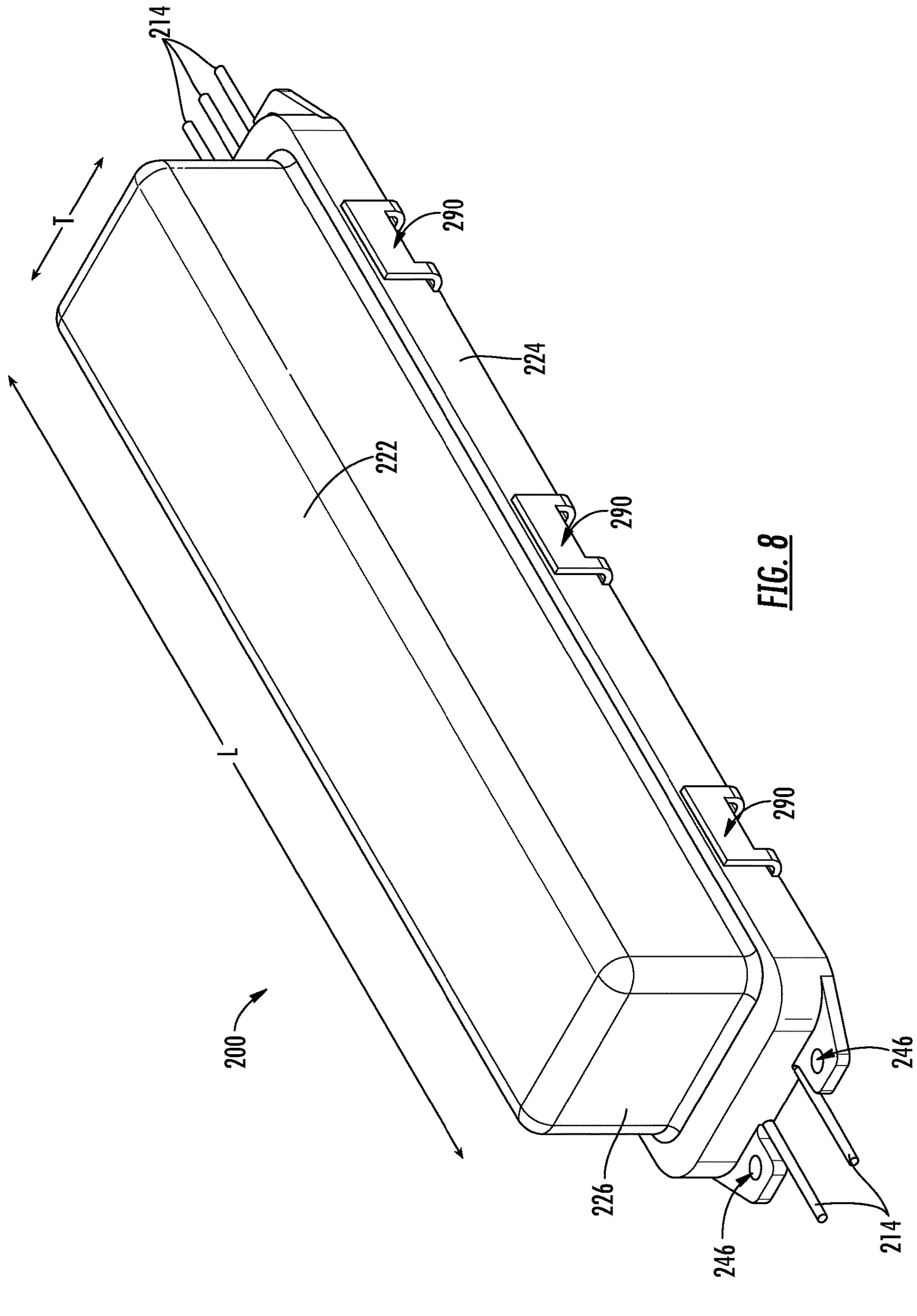
FIG. 8 depicts a perspective view of a driver assembly of a lighting fixture according to example embodiments of the present disclosure.
Figure 9:
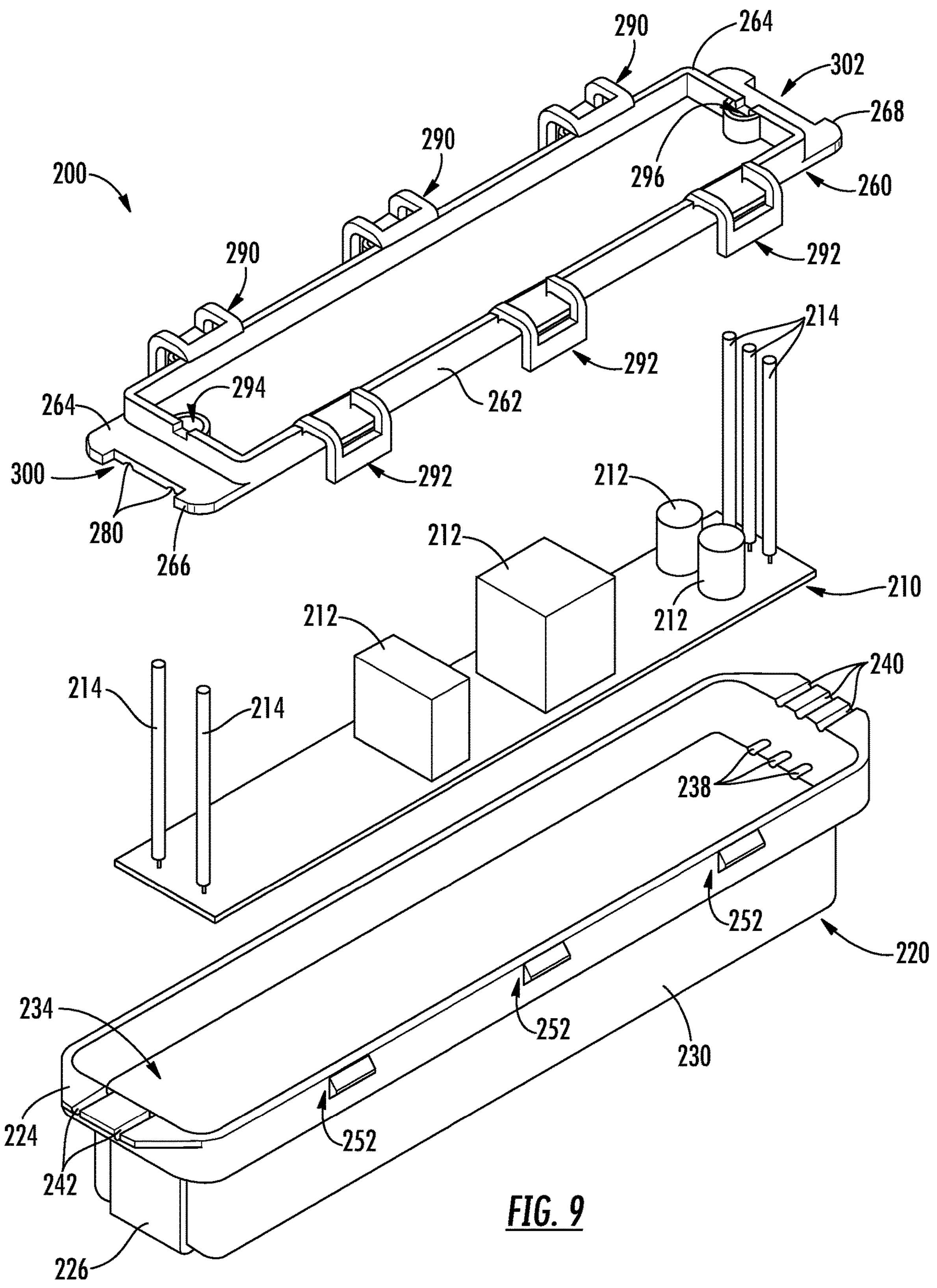
FIG. 9 depicts an exploded view of a driver assembly of a lighting fixture according to example embodiments of the present disclosure.
Figure 10:
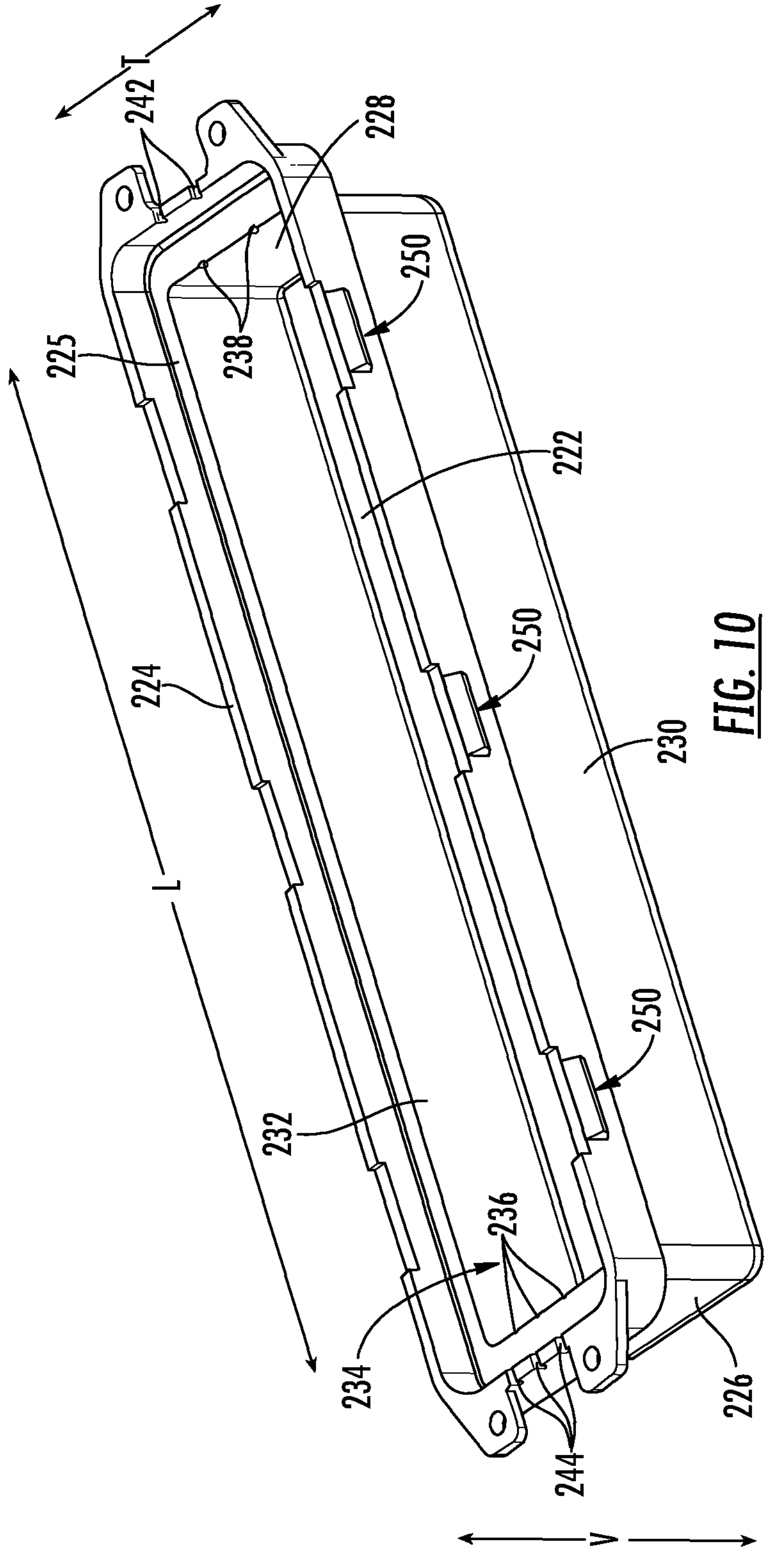
FIG. 10 depicts a perspective view of a housing of a driver assembly according to example embodiments of the present disclosure.
Figure 11:
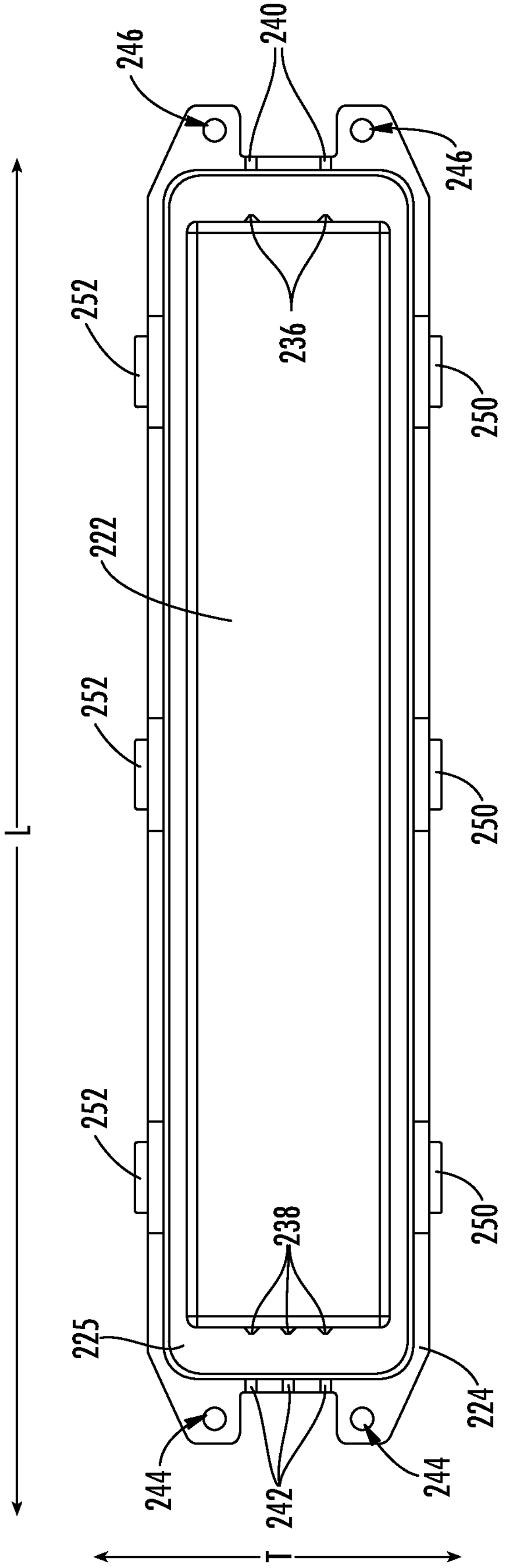
FIG. 11 depicts a top view of the housing depicted in FIG. 10.
Figure 12:
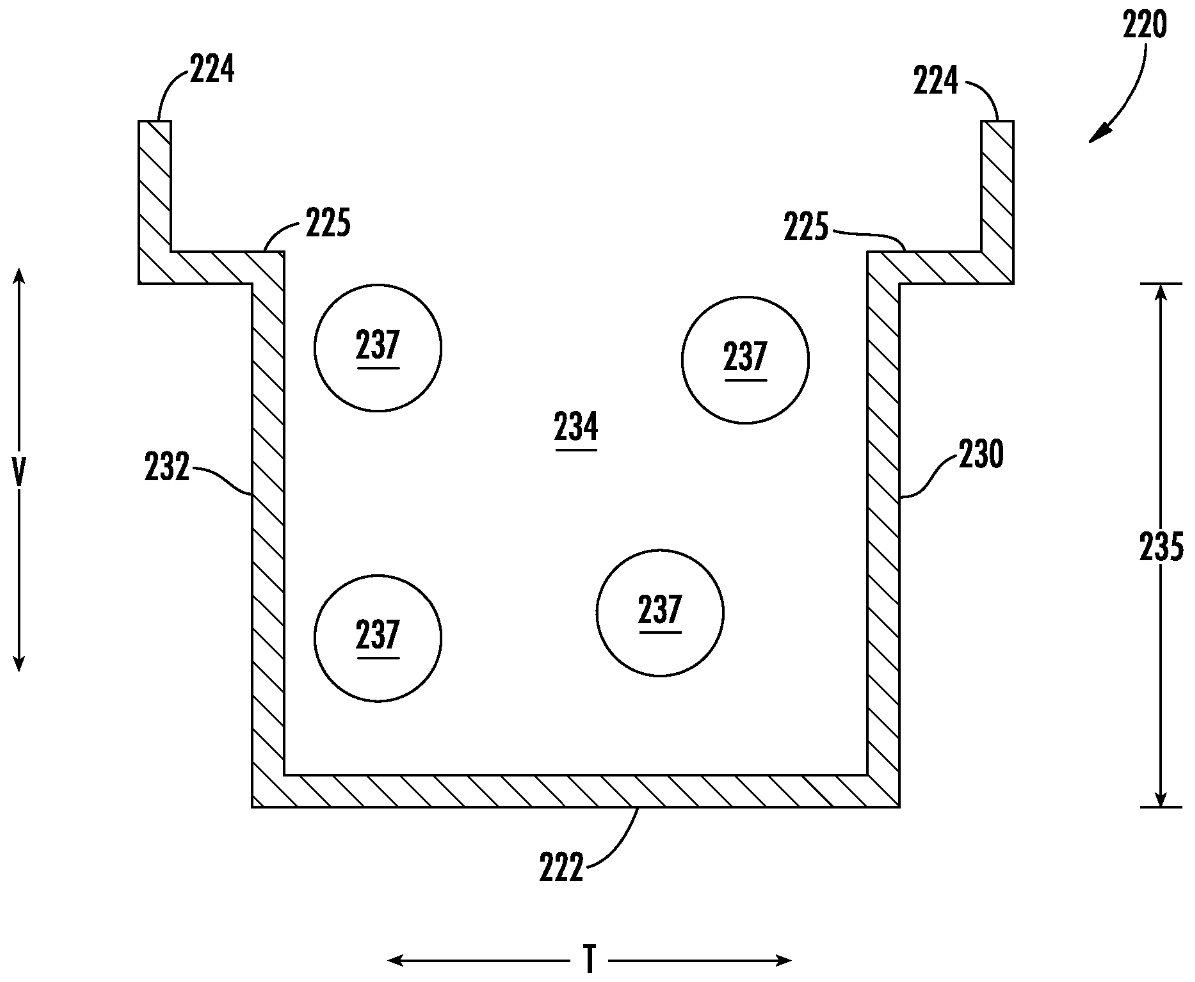
FIG. 12 depicts a cross-sectional view of the housing depicted in FIG. 10.
Figure 13:
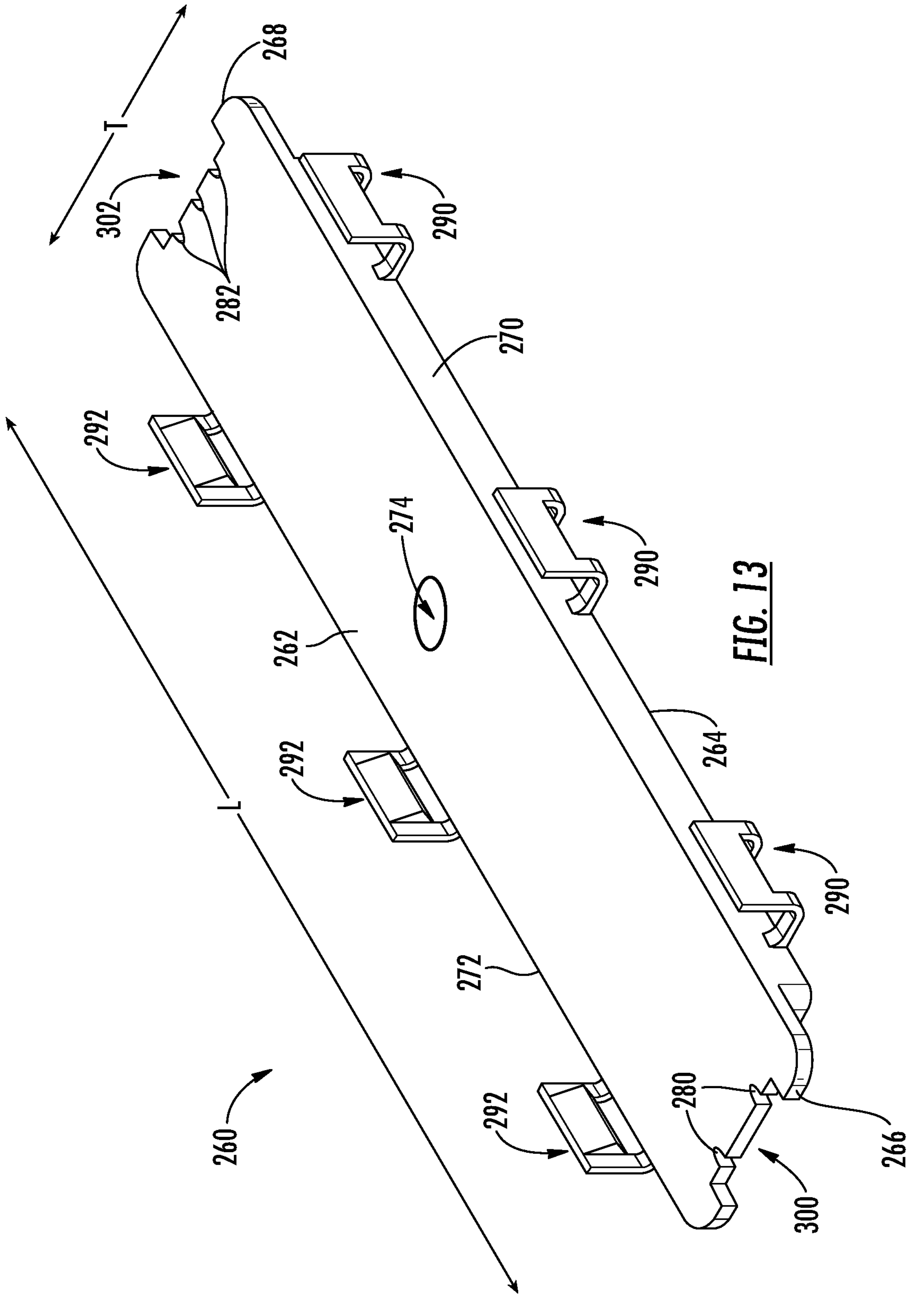
FIG. 13 depicts a perspective view of a base of a driver assembly according to example embodiments of the present disclosure.

Referring now to FIGS. 5 through 7, each modular lighting component 102 can include a sealed exterior housing 126 that contains a lighting assembly 110. More specifically, as shown, the lighting assembly 110 can include an LED light engine 114 (also referred to herein as an LED module) or other suitable system including a plurality of LED devices 116 mounted on an LED board 118. In addition, as shown particularly in FIG. 8, the LED module 114 may also include at least one fuse 140 or diode(s) mounted on the LED board 118. For example, as shown in the illustrated embodiment, the LED devices 116 may be arranged in a plurality of rows (e.g. two rows) on the LED board 118, with the fuse(s) 140 or diode(s) fitted between each of the LED devices 116. Thus, in such embodiments, the fuse(s) 140 is configured to electrically couple each of the LED devices 116 to the power circuit 112 (FIG. 4) and/or to each other. As such, in the case of an open circuit failure, the fuse(s) 140 or diode(s) can intercept the current such that the LED devices 116 can continue to function properly. In other example aspects of the present disclosure, as shown in FIG. 7, the LED module 114 can include one or more layers of thermal transfer tape 142 adjacent to a bottom-side of the LED board 118 opposite the plurality of LED devices 116.

The LED devices 116 can be configured to emit light as a result of movement of electrons through a semiconductor material. Further, the LED devices 116 can be of any suitable size, color, color temperature, etc. for desired light applications. For instance, in certain embodiments, the LED devices 116 can have a color temperature of, for instance, 3000K, 4000K, 5000K or other suitable color temperature. In addition, as shown, an optic 120 (e.g., a lens) can be positioned over or relative to each LED device 116. The optics 120 and/or arrangement of LED devices 116 can be configured to provide a variety of different light distributions, such as a type I distribution, type II distribution, type III distribution, type IV distribution, type V distribution (e.g., round, square, round wide, etc.) or other light distribution. More specifically, in certain embodiments, one or more of the optics 120 may correspond to silicone directional optics.

In some embodiments, each of the optics 120 of the LED module 114 may be joined together via an optic frame assembly 122. For example, as shown, the optic frame assembly 122 may correspond to a gasket (e.g., a polyurethane gasket) that is placed over the optics 120 to ensure alignment of the optics 120 with the LED devices 116 and/or to weatherproof the LED light engine 114. In some implementations, the gasket can also aid in alignment in the direction perpendicular to the LED board 118, for instance, by pressing the optics 120 against the LED board 118.

In some embodiments, the sealed exterior housing 126 can include a potting material 134 that is configured to at least partially fill an interior volume thereof so as to provide protection against any fault conditions. In certain embodiments, the potting material 134 described herein may correspond to any a solid or gelatinous compound that provides resistance to shock and/or vibration. In addition, the potting material 134 may prevent moisture and/or corrosive agents from entering the LED module 114. More specifically, in particularly embodiments, the potting material 134 may include thermosetting plastics and/or silicone rubber gels.

The lighting fixture 100 can be mounted and configured in a variety of manners to provide illumination in a variety of different lighting applications. For example, the lighting fixture 100 may include an arm mount (not shown) mechanically coupled thereto. In such embodiments, the arm mount can be used to mount the lighting fixture 100 to a pole, a wall, or any other suitable surface.

Referring now to FIGS. 8 through 17, an example embodiment of the driver assembly 200 is provided. As shown, the driver assembly 200 defines a lateral direction L, a transverse direction T, and a vertical direction V. The driver assembly 200 can include a driver circuit 210 configured to receive an input power, such as an input AC power or an input DC power, and can convert the input power to a suitable driver output (e.g. driver current) for powering the LED devices 116 (FIG. 6) of the lighting assembly 110 (FIG. 5) onboard the modular lighting components 102 (FIG. 5).

In some embodiments, the driver circuit 210 can include various components 212, such as switching elements (e.g. transistors) that are controlled to provide a suitable driver output. For instance, in one embodiment, the driver circuit 210 can include one or more transistors. Gate timing commands can be provided to the one or more transistors to convert the input power to a suitable driver output using pulse width modulation techniques. In one example, the driver circuit 210 can convert the input power to a driver output that can range from about 0V to about 60V DC. In some example embodiments, the driver circuit 210 can be a line dimming driver, such as a phase-cut dimmable driver, Triac dimmer, trailing edge dimmer, or other line dimming driver. The driver output can be adjusted using the line dimming driver by controlling the input power to the dimmable driver circuit.

As shown, the driver assembly 200 can include a housing 220. The housing 220 can extend along the vertical direction V between a top portion 222 and a bottom portion 224, along the lateral direction L between a first side 226 and a second side 228, and along the transverse direction T between a front portion 230 and a rear portion 232. In some embodiments, the bottom portion 224 can include a lip 225. As shown, the lip 225 can extend outwardly from both the front and rear portions 230, 232 of the housing 220. More specifically, the lip 225 can extend outwardly from the front and rear portions 230, 232 along the transverse direction T. It should be appreciated that the housing 220 can be comprised of any suitable material. For instance, in some embodiments, the housing 220 can be comprised of plastic.

In some embodiments, the housing 220 can define a cavity 234 that extends along the vertical direction V between the top portion 222 and the bottom portion 224, along the lateral direction L between the first side 226 and the second side 228, and along the transverse direction T between the front portion 230 and the rear portion 232. In some embodiments, the cavity 234 can accommodate the driver circuit 210. Additionally, the cavity 234 can accommodate a potting material 237, such as sand. For instance, the cavity 234 can be filled with the potting material 237 to a predetermined depth 235. More specifically, the predetermined depth 235 can extend between the lip 225 and the top portion 222 along the vertical direction V. As will be discussed below in more detail, the potting material can shield the driver circuit 210 from a hazardous environment surrounding a lighting fixture 100 (FIG. 1) in which the driver assembly 200 is installed.

It should be appreciated that filling the cavity 234 with the potting material 237 can displace air within the cavity 234. In this manner, the potting material 237 can provide thermal benefits, namely a reduction in a temperature within the cavity 234. It should also be appreciated that displacing the air within the cavity 234 can reduce a pressure within the cavity 234. In this manner, the driver circuit 210 can be less susceptible to ignition sources in an external environment surrounding the housing 220. Accordingly, the driver assembly 200 according to example aspects of the present disclosure can be more suitable for use in lighting fixtures included in hazardous environments, such as oil rigs.

Figure 14:
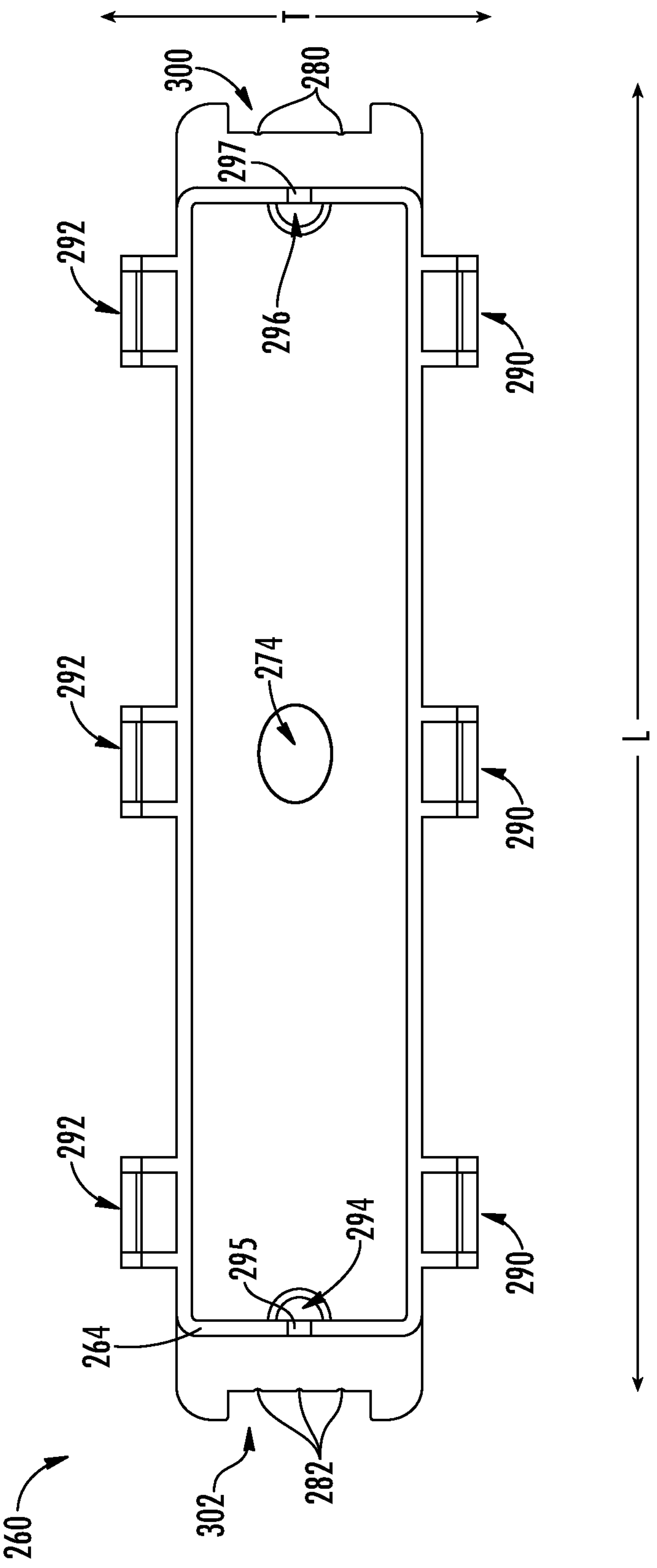
FIG. 14 depicts a bottom view of a base of a driver assembly according to example embodiments of the present disclosure.
Figure 15:
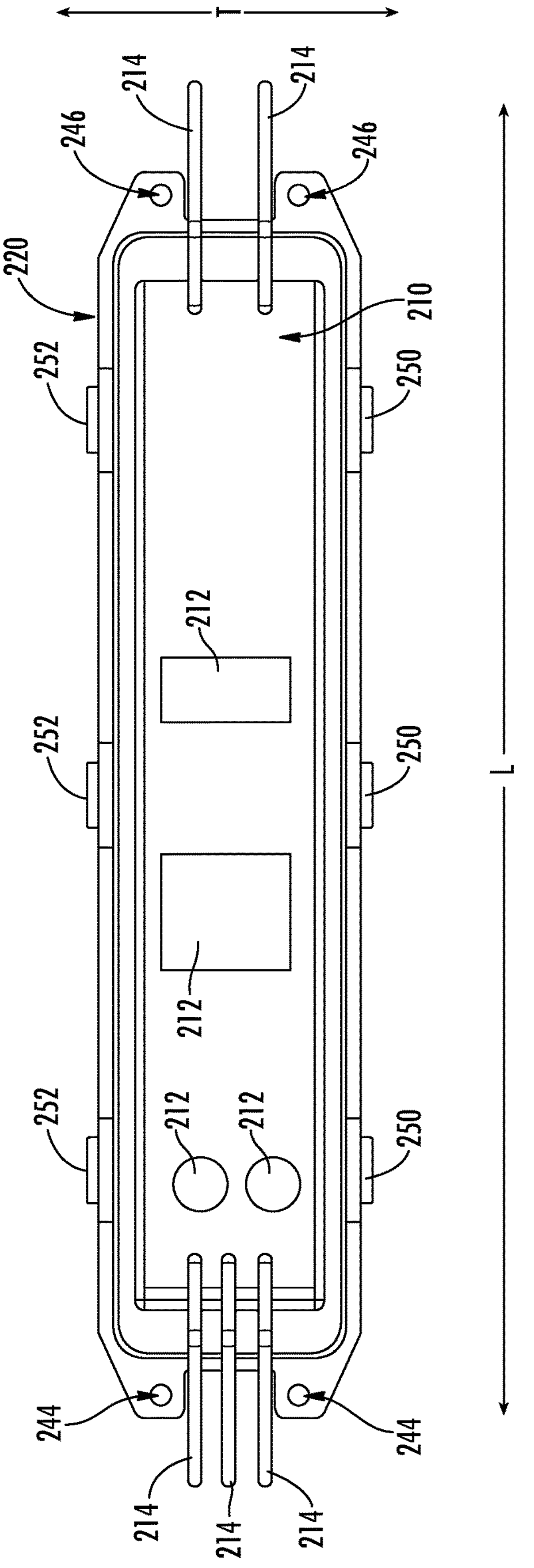
FIG. 15 depicts a driver circuit of a driver assembly disposed within a housing of the driver assembly according to example embodiments of the present disclosure.

In some embodiments, the bottom portion 224 of the housing 220 can define a first set of indentations 236 and a second set of indentations 238 spaced apart from the first set of indentations 236 along the lateral direction L. The bottom portion 224 of the housing 220 can further define a third set of indentations 240 and a fourth set of indentations 242. As shown, the fourth set of indentations 242 can be spaced apart from the third set of indentations 240 along the lateral direction L. Additionally, the third and fourth set of indentations 240, 242 can be spaced apart from the first and second set of indentations 236, 238 along the vertical direction V. In some embodiments, as shown in FIG. 14, the first, second, third, and fourth indentations 236, 238, 240, 242 can accommodate one or more conductors 214 associated with the driver circuit 210.

In some embodiments, the bottom portion 224 of the housing 220 can define a first set of apertures 244 and a second set of apertures 246 spaced apart from the first set of apertures 244 along the lateral direction L. More specifically, the first set of apertures 244 can include a pair of apertures spaced apart from one another along the transverse direction T. Alternatively or additionally, the second set of apertures 246 can include a pair of apertures spaced apart from one another along the transverse direction T. In some embodiments, the third set of indentations 240 can include three indentations spaced apart from one another along the transverse direction T between the first set of apertures 244. Alternatively or additionally, the fourth set of indentations 242 can include two indentations spaced apart from one another along the transverse direction T between the second set of apertures 246.

In some embodiments, the driver assembly 200 can be secured to a surface of the modular housing portion 104 (FIG. 1) via one or more fasteners extending through apertures 244, 246 of the housing 220. It should be appreciated, however, that the driver assembly 200 can be secured to the surface of the modular housing portion 104 via any suitable method. For instance, in one embodiment, the housing 220 of the driver assembly 200 can be secured to the surface of the modular housing portion 104 via one or more clips.

As shown, the housing 220 can, in some embodiments, include a first set of projections 250 and a second set of projections 252 spaced apart from the first set of projections 250 along the transverse direction T. Both the first set of projections 250 and the second set of projections 252 can extend outwardly from the bottom portion 224 of the housing 220. As will be discussed below in more detail, the first and second set of projections 250, 252 can provide a means for attaching a the base 260 of the driver assembly 200 to the housing 220.

As shown, the base 260 of the driver assembly 220 extends along the vertical direction V between a top portion 262 and a bottom portion 264, along the lateral direction L, between a first side 266 and a second side 268, and along the transverse direction T between a front portion 270 and a rear portion 272. In some embodiments, the top portion 262 of the base 260 defines a first set of indentations 280 and a second set of indentations 282 spaced apart from the first set of indentations 280 along the lateral direction L. The first set of indentations 280 can, in some embodiments, be positioned adjacent the first side 266 of the base 260. Alternatively or additionally, the second set of indentations 282 can be positioned adjacent the second side 268 of the base 260. It should be appreciated that the base 260 can be comprised of any suitable material. For instance, in some embodiments, the base 260 can be comprised of plastic.

Figure 16:
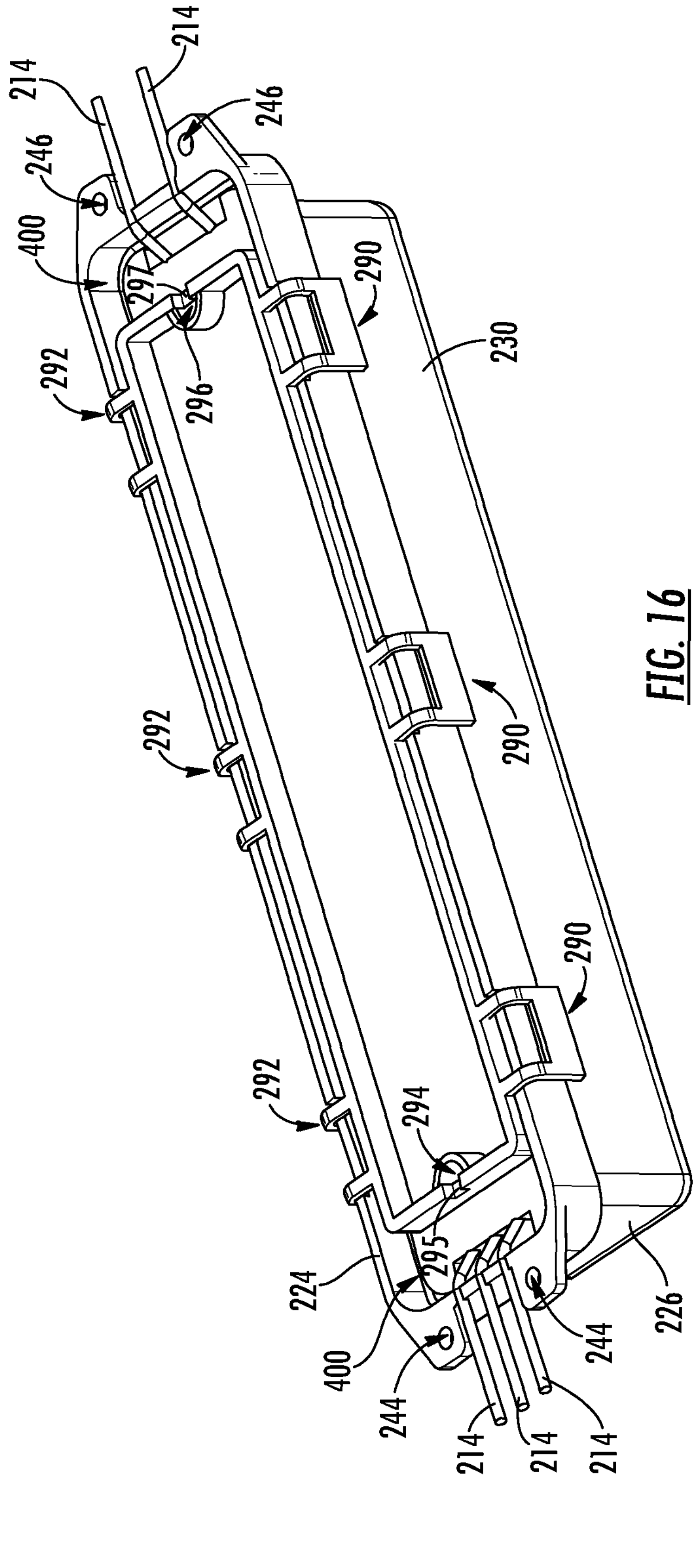
FIG. 16 depicts a base of a driver assembly secured to the housing depicted in FIG. 15.

In some embodiments, the base 260 can include a first set of tabs 290 and a second set of tabs 292. As shown, the second set of tabs 292 can be spaced apart from the first set of tabs 290 along the transverse direction T. The first set of tabs 290 can extend outwardly from the front portion 270 of the base 260, whereas the second set of tabs 292 can extend outwardly from the rear portion 272 of the base 260. When the base 260 is attached to the housing 220 as shown in FIG. 16, each tab of the first set of tabs 290 engages a corresponding projection of the first set of projections 250. Additionally, each tab of the second set of tabs 292 engages a corresponding projection of the second set of projections 252. In this manner, the base 260 and the housing 220 can be secured to one another.

As discussed above, the cavity 234 (FIG. 12) can be filled with the potting material 237. In some embodiments, the cavity 234 can be filled with the potting material 237 to depth that is less than the predetermined depth 235. Then, the base 260 can be attached to the housing 220 as shown in FIG. 16. Once the base 260 is attached to the housing 220, the potting material 237 can flow into the cavity 234 via an aperture 274 defined by the base 260. In this manner, the cavity 234 can continue to be filled with the potting material 237 until the cavity 234 is filled to the predetermined depth 235. As shown, the aperture 274 can be defined by the top portion 262 of the base 260. More specifically, the aperture 274 can be located at a center of the top portion 274. It should be appreciated, however, that the aperture 274 can be located at any suitable location on the top portion 262 of the base 260.

In some embodiments, the bottom portion 264 of the base 260 can define a first reservoir 294 and a first notch 295. As shown, the first notch 294 can be positioned adjacent to the first reservoir 294. In this manner, a solid or gelatinous material can flow into the first reservoir 294 via the first notch 295. Alternatively or additionally, the bottom portion 264 of the base 260 can define a second reservoir 296 and a second notch 297. As shown, the second reservoir 297 can be spaced apart from the first reservoir 294 along the lateral direction L. In addition, the second notch 297 can be positioned adjacent to the second reservoir 296 so that the solid or gelatinous material can flow into the second reservoir 296 via the second notch 297. As will be discussed below in more detail, the solid or gelatinous material flowing into the first and second reservoirs 294, 296 can indicate a sufficient amount of the solid or gelatinous material has been used to seal the cavity 234.

In some embodiments, the base 260 defines a first recess 300 and a second recess 302 spaced apart from the first recess 300 along the lateral direction L. As shown, the first recess 300 can be defined by the first side 266 of the base 260. Alternatively or additionally, the second recess 302 can be defined by the second side 268 of the base 260. When the base 260 is attached to the housing 220, the first recess 300 can accommodate a first set of conductors 214 associated with the driver circuit 210. Additionally, the second recess 302 can accommodate a second set of conductors 214 associated with the driver circuit 210. In this manner, the driver circuit 210 enclosed within the cavity 234 can be in electrical communication with the LED devices 116 via the conductors 214.

Figure 17:
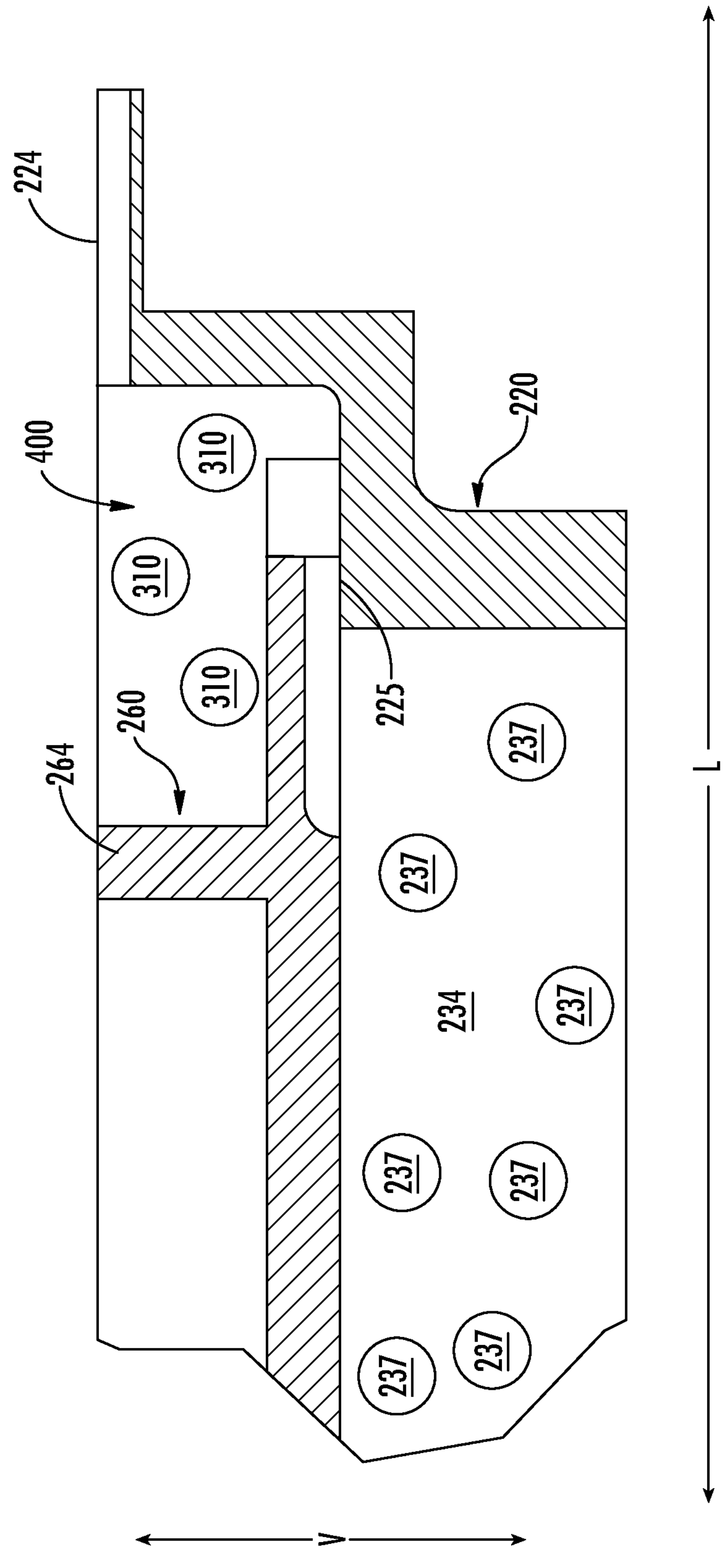
FIG. 17 depicts a cross-sectional view of the base of the driver assembly secured to the housing of FIG. 16.

Referring now to FIGS. 16 and 17 in combination, the base 260 can contact the lip 225 of the bottom portion 224 when the base 260 is attached to the housing 220. Alternatively or additionally, the first and second recesses 300, 302 can be filled with a solid or gelatinous material 310 to seal the cavity 234, including the driver circuit 210 and the potting material 237 disposed therein, from an external environment surrounding the housing 220.

In some embodiments, the sold or gelatinous material 310 can fill a space 400 defined between the base 260 and the housing 220. More specifically, the space 400 can be defined along both the lateral direction L between the bottom portion 264 of the base 260 and the bottom portion 224 of the housing 220. Additionally, the space 400 can extend along the vertical direction V from the lip 225 of the bottom portion 224. In some embodiments, the space 400 is filled with the solid or gelatinous material 310 until the solid or gelatinous material 310 enters the first and second reservoirs 294, 296 via the first and second notches 295 and 297, respectively. In this manner, the first and second reservoirs 294, 296 can provide a visual aid indicative of when the space 400 has been filled to a depth needed to seal the cavity 234 from an ignition source (e.g., flame).

It should be appreciated that filling the space 400 with the solid or gelatinous material 310 can improve the seal between the driver circuit 210 (FIG. 14) and the external environment surrounding the housing 220. Accordingly, the driver assembly 200 according to example embodiments of the present disclosure can be suitable for use in lighting fixtures installed in hazardous environments, such as an oil rig.

The example configurations illustrated in the figures are provided for purposes of illustration and discussion. Those of ordinary skill in the art, using the disclosures provided herein will understand that other example configurations can be generated using the lighting fixture 100 without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A driver assembly for a lighting fixture, the driver assembly defining a lateral direction (L), a transverse direction (T), and a vertical direction (V), the driver assembly comprising:
- a housing defining a cavity;
- a driver circuit disposed within the cavity, the driver circuit configured to provide power to one or more light emitting diodes of the lighting fixture;
- a potting material disposed within the cavity; and
- a base attached to the housing to enclose the driver circuit and the potting material within the cavity, wherein a bottom portion of the housing defines one or more indentations configured to accommodate one or more conductors associated with the driver circuit.

2. The driver assembly of claim 1, wherein the potting material comprises sand.

3. The driver assembly of claim 1, wherein the one or more indentations defined by the bottom portion of the housing includes:
- a first set of indentations;
- a second set of indentations spaced apart from the first set of indentations along the lateral direction (L);
- a third set of indentations spaced apart from the first set of indentations and the second set of indentations along the vertical direction (V); and
- a fourth set of indentations spaced apart from the first set of indentations and the second set indentations along the vertical direction (V), the fourth set of indentations further spaced apart from the third set of indentations along the lateral direction (L).

4. The driver assembly of claim 1, wherein the base defines one or more indentations configured to accommodate the one or more conductors associated with the driver circuit.

5. The driver assembly of claim 4, wherein the one or more indentations defined by the base include:
- a first set of indentations positioned adjacent a first side of the base; and
- a second set of indentations positioned adjacent a second side of the base, the second side spaced apart from the first side along the lateral direction (L).

6. The driver assembly of claim 1, wherein the base comprises:
- a first side defining a first recess configured to accommodate a first set of conductors associated with the driver circuit; and
- a second side spaced apart from the first side along the lateral direction (L), the second side defining a second recess configured to accommodate a second set of conductors associated with the driver circuit.

7. The driver assembly of claim 1, wherein a bottom portion of the housing defines:
- a first reservoir; and
- a second reservoir spaced apart from the first reservoir along the lateral direction (L).

8. The driver assembly of claim 7, wherein:
- at least a portion of the first reservoir is filled with the cement; and
- at least a portion of the second reservoir is filled with the cement.

9. The driver assembly of claim 8, wherein the bottom portion of the housing further defines:
- a first notch positioned adjacent the first reservoir; and
- a second notch positioned adjacent the second reservoir.

10. The driver assembly of claim 9, wherein:
- the cement flows into the first reservoir via the first notch; and
- the cement flows into the second reservoir via the second notch.

11. The driver assembly of claim 1, wherein:
- the housing includes a plurality of projections; and
- the base includes a plurality of tabs, each tab of the plurality of tabs (290, 292) engaging one projection of the plurality of projections to secure the base to the housing.

12. The driver assembly of claim 11, wherein the plurality of projections extend from a bottom portion of the housing.

13. The driver assembly of claim 11, wherein the plurality of tabs comprise:

a first set of tabs extending from a front portion of the base, each tab of the first set of tabs configured to engage a projection of a first set of projections extending from the bottom portion of the housing; and a second set of tabs extending from a rear portion of the base, each tab in the second set of tabs configured to engage a projection of a second set of projections extend from the bottom portion of the housing.

14. A driver assembly for a lighting fixture, the driver assembly defining a lateral direction (L), a transverse direction (T), and a vertical direction (V), the driver assembly comprising:

a housing defining a cavity;

a driver circuit disposed within the cavity, the driver circuit configured to provide power to one or more light emitting diodes of the lighting fixture;

a potting material disposed within the cavity; and a base attached to the housing to enclose the driver circuit and the potting material within the cavity;

wherein the base comprises:

a first side defining a first recess configured to accommodate a first set of conductors associated with the driver circuit; and a second side spaced apart from the first side along the lateral direction (L), the second side defining a second recess configured to accommodate a second set of conductors associated with the driver circuit; and wherein both the first recess and the second recess are filled with a cement to seal the driver circuit and the potting material within the cavity.

* * * * *